US012751809B2

(12) United States Patent
Perdew et al.

(10) Patent No.: US 12,751,809 B2
(45) Date of Patent: Oct. 6, 2026

(54) NON-HUMAN ANIMAL COMPRESSION THERAPY DEVICES AND METHODS

(71) Applicant: Mego Afek AC Ltd., Afek (IL)

(72) Inventors: Irina A. Perdew, Morrisville, NC (US); Lauren V. Schnabel, Holly Springs, NC (US); Asher Ben Noon, Kibbutz Afek (IL)

(73) Assignee: Mego Afek AC Ltd., Afek (IL)

( * ) Notice: Subject to any disclaimer, the term of this patent is extended or adjusted under 35 U.S.C. 154(b) by 1112 days.

(21) Appl. No.: 17/784,978

(22) PCT Filed: Dec. 11, 2020

(86) PCT No.: PCT/US2020/064615
§ 371 (c)(1),
(2) Date: Jun. 13, 2022

(87) PCT Pub. No.: WO2021/119494
PCT Pub. Date: Jun. 17, 2021

(65) Prior Publication Data
US 2023/0028017 A1 Jan. 26, 2023

Related U.S. Application Data

(60) Provisional application No. 62/947,637, filed on Dec. 13, 2019.

(51) Int. Cl.
*A61D 9/00* (2006.01)
*A61H 9/00* (2006.01)

(52) U.S. Cl.
CPC ............. *A61D 9/00* (2013.01); *A61H 9/0078* (2013.01); *A61H 2201/0103* (2013.01);
(Continued)

(58) Field of Classification Search
CPC ........ A61H 9/0078; A61H 9/00; A61H 9/005; A61H 9/0092; A61H 2203/03;
(Continued)

(56) References Cited

U.S. PATENT DOCUMENTS

| | | | |
|---|---|---|---|
| 581,042 | A | 4/1897 | Sites |
| 3,193,984 | A | 7/1965 | Schubert |

(Continued)

FOREIGN PATENT DOCUMENTS

| | | | |
|---|---|---|---|
| WO | WO 2012/094712 | 7/2012 | |
| WO | WO-2012094712 A1 * | 7/2012 | ........... A01K 13/008 |
| WO | WO 2014/057285 A1 | 4/2014 | |

OTHER PUBLICATIONS

International Preliminary Report on Patentability Corresponding to Patent Application No. PCT/US2020/064615 dated Jun. 23, 2022.

(Continued)

*Primary Examiner* — Brandy S Lee
*Assistant Examiner* — Sara K Toich
(74) *Attorney, Agent, or Firm* — The Roy Gross Law Firm, LLC; Roy D. Gross

(57) ABSTRACT

Non-human animal compression therapy devices and methods. In some embodiments, the compression therapy devices includes one or more sleeves, each of the one or more sleeves being configured to fit a limb of a non-human animal, and each of the one or more sleeves comprising one or more inflatable chambers; and a controllable air source operably connected with the one or more inflatable chambers and configured to controllably inflate and deflate the one or more inflatable chambers. In some embodiments, at least one cycle of inflating and deflating of the one or more chambers starts by inflating the most distal chamber. In some (Continued)

embodiments, the compression therapy is given to eliminate or ease suffering from a disease or disorder or a sporting or work-related injury.

27 Claims, 12 Drawing Sheets

(52) U.S. Cl.
CPC ................ *A61H 2201/1238* (2013.01); *A61H 2201/1642* (2013.01); *A61H 2203/03* (2013.01)

(58) Field of Classification Search
CPC .... A61H 2201/0103; A61H 2201/1238; A61H 2201/1642; A61H 23/04; A61D 9/00; A01K 13/007; B68C 1/14; B68C 1/20; B68C 5/00; B68B 7/00
See application file for complete search history.

(56) References Cited

U.S. PATENT DOCUMENTS 3,851,447 A * 12/1974 Pontarella ............ A01K 13/007 54/80.1
6,558,338 B1 5/2003 Wasserman
8,465,444 B1 * 6/2013 Kopacki .............. A61H 9/0092 601/152
2009/0255531 A1 * 10/2009 Johnson .................... A61F 5/24 128/99.1
2010/0043724 A1 * 2/2010 Sherer .................. A01K 13/006 54/79.2
2010/0050959 A1 * 3/2010 Mcpeak-Young ....... A61D 9/00 119/850
2011/0098616 A1 * 4/2011 Ben-Nun ............. A61H 9/0078 601/151
2012/0247399 A1 * 10/2012 Rivera-Brutto .......... A61D 9/00 119/850
2013/0123886 A1 * 5/2013 Chiu ........................ A61D 9/00 607/104
2017/0118956 A1 * 5/2017 Evanko ................ A01K 13/008
2017/0280682 A1 * 10/2017 Ruetenik ................... A01L 5/00
2018/0002156 A1 * 1/2018 Aksoyek ................... B68C 1/14

OTHER PUBLICATIONS

International Search Report and Written Opinion of the International Searching Authority Corresponding to International Application No. PCT/US 2020/064615 dated Mar. 11, 2021.
Keckler, "Lymphangitis: A Frustrating Condition." American Associate of Equine Practitioners. Available from: aaep.org/horsehealth/lymphangitis-frustrating-condition.

* cited by examiner

NON-HUMAN ANIMAL COMPRESSION THERAPY DEVICES AND METHODS

CROSS-REFERENCE TO RELATED APPLICATION

The present application claims priority to U.S. Provisional Patent Application Ser. No. 62/947,637, filed Dec. 13, 2019, the entire disclosure of which is incorporated by reference herein.

TECHNICAL FIELD

Disclosed herein are compression therapy devices and related methods for non-human animals. More particularly, in some embodiments, disclosed here are compression therapy devices and related methods for use in equines, dogs, and camelids.

BACKGROUND

The lymphatic system in some mammals is often called the "sewage system" since it removes waste products out of the body such as dead white cells, bacteria, proteins, fat, and metabolic wastes. The fluid, usually taken up by the lymph vessels from the interstitial space, leaks out of the smallest vessels of the circulatory system, called capillaries. The lymphatic fluid is then "scanned" and "filtered" as it flows through the lymph nodes. The lymphatic system generally relies on pressure and muscle contractions to propel the fluid proximally out of the distal limb. Some mammals, including quadrupeds such as dogs and horses, lack any substantial musculature in the distal limbs, which potentially predisposes them to developing a buildup of fluid or edema. The edema can be secondary to an injury or due to primary inflammation of the lymphatic system called lymphangitis. In either case, the management is difficult, and the dogs and horses are uncomfortable.

Daily treatments such as bandaging, manual massage, and special exercise can be expensive, time consuming, and often are not enough to manage flare ups in acute or chronic cases which results in a costly emergency vet visit. After the initial episode of edema, the lymphatic system can get scarred which predisposes the horse to future, potentially more severe episodes of lymphangitis. Because the dogs or horses off-weight the affected limb, the opposite limb can develop issues related to the excess weight. Other conditions that may cause similar issues include lymphatic drainage, edema reduction post-surgery, lymphangitis, laminitis, cellulitis, or any combination thereof.

It is therefore desired to have a compression device or system configured to help treat or even prevent the swelling and edema associated with lymphangitis lymphatic drainage, edema post-surgery, lymphangitis, laminitis, cellulitis, or any combination thereof.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In accordance with some embodiments of the presently disclosed subject matter provided is a compression device for a non-human animal. In some embodiments, the compression device comprises one or more sleeves configured to fit a limb of a non-human animal, the one or more sleeves comprising one or more inflatable chambers; and a controllable air source operably connected with the one or more chambers and configured to controllably inflate and deflate the one or more chambers. In some embodiments, the non-human animal is an equine, canine, or camelid.

In some embodiments, at least one of the one or more sleeves is configured for a front limb of an equine subject and when worn by the equine subject, has a cylindrical shape and have a length that covers a distance from a coffin joint to a shoulder joint of the equine subject. In some embodiments, at least one of the one or more sleeves is configured for a hind limb of an equine subject and when worn by the equine subject has a shape that adjusts to a shape of the hind limb and a length to cover the hind limb from a pastern to a stifle of the hind limb. In some embodiments, the compression device comprises four sleeves, wherein two of the sleeves are configured to respectively fit two front limbs of the non-human animal and two of the sleeves are configured to respectively fit two hind limbs of the non-human animal.

In some embodiments, each sleeve comprises one or more zippers. In some embodiments, each sleeve comprises two zippers on a front side of the sleeve and three zippers on a back side of the sleeve, wherein the zippers are configured to provide a circumference adjustment. In some embodiments, the zippers are configured to zip from top to bottom.

In some embodiments, each of the one or more sleeves has four chambers.

In some embodiments, the controllable air source operably connected with the one or more chambers and configured to inflate and deflate the one or more chambers, comprises one or more hoses that connect the air source to the one or more chambers. In some embodiments, each chamber has an individual hose connecting to the controllable air source. In some embodiments, the compression device further comprises one or more flaps covering the one or more hoses, such that each of the one or more hoses cannot be accessed by a non-human animal wearing the device. In some embodiments, at an edge of each sleeve, each of the one or more hoses connect into a bundle that is attached to a port that inserts into the controllable air source.

In some embodiments, the controllable air source is configured such that two ports can be plugged in at once. In some embodiments, the controllable air source is an air pump. In some embodiments, the controllable air source is battery operated. In some embodiments, the controllable air source is preprogrammed to start inflating the one or more chambers at the most distal chamber.

In some embodiments, the compression device further comprises a saddle pad configured for placement on a non-human animal's body, the saddle pad comprising one or more pockets to house the controllable air source. In some embodiments, the one or more pockets is configured to fall on a side and a medial aspect of the non-human animal.

In some embodiments, the compression device further comprises a girth strap having a first end and a second end and configured to loop under an abdomen of the non-human for attachment to the saddle pad.

In some embodiments, the compression device further comprises one or more strap configured for detachably connecting from a caudal edge of the saddle pad and extending towards a tail of the non-human animal for detachably connecting to the one or more sleeves configured for placement on one or more hind limbs of the non-human animal. In some embodiments, the one or more strap comprises one strap having a y-configuration, such that the strap forks near the tail and each fork extends laterally to attach to the one or more sleeves configured for placement on one or more hind legs of the non-human animal in a manner out of the non-human animal's reach.

In some embodiments, the compression device further comprises one or more strap configured for detachably connecting from a cranial edge of the saddle pad toward a neck of the non-human animal for detachably connecting to one or more sleeve configured for placement on one or more front limbs of the non-human animal. In some embodiments, the one or more strap comprises one strap having a y-configuration, such that the strap forks around the neck of the horse to connect to the saddle pad and extends to the girth strap to define a breast plate, wherein one or more sleeve configured for placement on one or more front limbs of the non-human animal detachably connect to the breast plate in a manner out of the non-human animal's reach.

In some embodiments, the presently disclosed subject matter provides a method of compressing a limb of a non-human animal. In some embodiments, the method comprises: providing a non-human animal having a limb to be compressed; and employing a compression device in accordance with the presently disclosed subject matter to compress the limb of the non-human animal. In some embodiments, employing a compression device of the presently disclosed subject matter comprises: applying a sleeve of a compression device of the presently disclosed subject matter to the limb of a non-human animal; and inflating and deflating the one more of chambers of the sleeve, whereby the limb of the non-human animal is compressed.

In some embodiments, at least one cycle of inflating and deflating of the one or more chambers starts by inflating the most distal chamber.

In some embodiments, the method comprises compressing all of the non-human animal's limbs, including compressing all of the non-human animal's limbs at the same time.

In some embodiments, the non-human animal having a limb to be compressed comprises a non-human animal suffering from a disease or disorder or a sporting or work non-human animal in need of warm-up prior to a sporting event or work event, or recovery after a sporting event or work event. In some embodiments, the disease or disorder comprises lymphatic drainage, edema reduction post-surgery, lymphangitis, laminitis, cellulitis, or any combination thereof.

Accordingly, it is an object of the presently disclosed subject matter to provide non-human animal compression therapy devices and related methods. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description and Drawings.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which.

DETAILED DESCRIPTION

Figure 1:
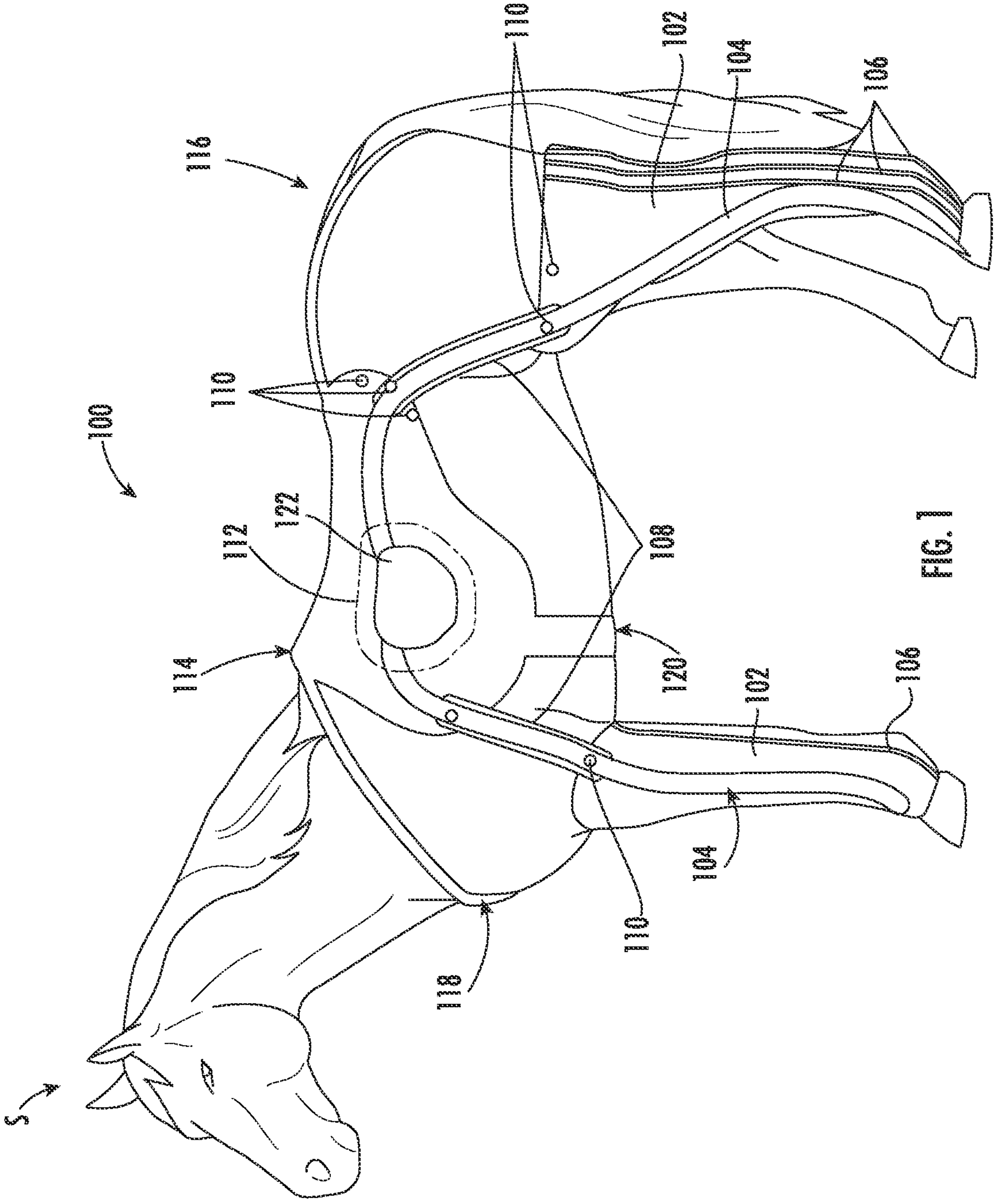
FIG. 1 is a side view of a horse wearing a compression device in accordance with the presently disclosed subject matter.

The presently disclosed subject matter is described more fully below, in which some, but not all possible embodiments of the presently disclosed subject matter are described. Indeed, the presently disclosed subject matter can be embodied in many different forms and should not be construed as limited to the embodiments set forth herein; rather, these embodiments are provided for purposes of example and illustration.

The presently disclosed subject matter provides in some embodiments a pneumatic compression device for reducing or treating swelling and edema in horses, dogs, and other mammals due to lymphangitis, cellulitis and the recovery of athletic animals post-exercise to prevent and treat occupational soft tissue injuries. In some embodiments, the pneumatic compression works by squeezing lymph fluid out of the space between the cells of the horse, dog, or other mammal, up the limb, reducing swelling and improving circulation which promotes healing and reduces muscle aches and pains.

To address the needs discussed above as well as other issues known in the art, the presently disclosed subject matter provides in some embodiments, a non-invasive compression device for horses, dogs, and other mammals. The device uses high quality compression garments or sleeves, which can have one or more inflatable air chambers, such as, for example and without limitation four (4) air chambers, on each leg to apply a gentle or firm massage and reduce limb edema in non-human animal subjects, such as equine, canine, camelid or other mammalian subjects. In some embodiments, the device is a pneumatic device and the air chambers on each sleeve inflate, optionally in a sequence starting at the distal limb and moving proximally, applying a smooth massage that assists in movement of static lymph fluid. The device provides circumferential and directional pressure to help move lymphatic fluid back into the vessels and up towards the major portions of the body (i.e., chest, abdomen, flank, barrel, shoulders, etc.), pushing the fluid past the main abdominal lymph nodes up to the thoracic duct, and eventually to the circulatory system. The circumferential pressure increases the hydrostatic pressure in the interstitial space which favors the movement of lymph fluid back into the lymph vessels while the sequential inflation of the air chambers promotes lymph movement from the most distal point of the limb towards the body.

The presently disclosed subject matter can also be employed with sporting and work non-human animals, such as racehorses, race dogs, hunting dogs, sledding dogs, and the like. Treatment benefits include accelerated recovery time after strenuous exercise, reduced healing and resting time between training sessions or competitions, lower risk of over exercise and muscle injury, and reduction or even improvement of scar tissue damage due to increased elasticity and the overall improvement of the circulation to name just a few. Regardless of the sport, the non-human animals can benefit from a warm-up and recovery regimen incorporating a device of the presently disclosed subject matter to not only address their overall health and welfare, but also potentially prevent/reduce the severity of a serious post-exercise condition. For example, muscle fatigue that comes with another cascade of events can result in death. Furthermore, the device can be used to potentially reduce scar tissue and improve the range of motion of the limb. In the non-human animal subjects, this could be the difference between euthanasia of the animal due to the development of many potentially fatal conditions in the limb opposite of the affected one.

I. Definitions

The terminology used herein is for the purpose of describing particular embodiments only and is not intended to be limiting of the presently disclosed subject matter. While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, sequence identity (e.g., when comparing two or more nucleotide or amino acid sequences), mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The disclosed devices, systems and any related methods are configured for use with equines, including for example but not limited to, horses, donkeys, mules and other hybrids, zebras, and the like. The disclosed devices, systems and any related methods are also configured for use with canines, including for example but not limited to, dogs, wolves, foxes, and the like, as well as camelids, such as, for example, camels. Although it is to be understood that the principles of the disclosed subject matter indicate that the disclosed devices, systems and any related methods can be effective for and/or configured to be use with other non-human vertebrate species, including non-human mammals, which are intended to be included in the term "subject". Moreover, a non-human mammal is understood to include any mammalian species to be secured by the disclosed devices and systems, particularly research, agricultural, sporting, and domestic non-human mammalian species. In some embodiments, the disclosed devices, systems and any related methods are particularly useful in the treatment of non-human warm-blooded vertebrates. Thus, the presently disclosed subject matter concerns non-human mammals and birds. In some embodiments, the subject to be used in accordance with the presently disclosed subject matter is a subject in need of treatment and/or diagnosis, and/or from which experimental data is to be collected.

II. Animal Compression Devices and Systems

Disclosed in accordance with some embodiments of the presently disclosed subject matter a compression therapy device for non-human animals, such as equines, like horses, canines, like dogs, and camelids, like camels. In some embodiments, the compression device comprises sleeves or garments comprise garments for four limbs that contain air pockets and can be connected in pairs to an air pump. In some embodiments, the presently disclosed device uses air to put pressure on the limb in a wave motion from distal to proximal limb. This promotes enhanced circulation, improves lymph flow, and/or reduces edema and swelling. In some embodiments, the device is used in the treatment of a condition known as lymphangitis. In some embodiments, the device is used as a recovery device for racehorses and other sports animals such as dogs and other quadrupeds. The presently disclosed device provides a solution for many conditions with a great tolerance, since the treatment is relaxing to the non-human animal, such as an equine, such as a horse. By way of further example, in the sports industry, the device can be used to warm up a horse or a dog before a race and cool down afterwards. In some embodiments, uses for the presently disclosed device include uses in the medical field, such as lymphatic drainage, edema reduction post-surgery, edema reduction in certain conditions such as lymphangitis, pain reduction therapy in laminitis. For performance horses or other performance animals, warm-up therapy prior to a race or other, recovery after a race.

Referring now to the Figures, wherein like reference numbers refer to like parts throughout, and referring to FIG. 1, which illustrates a side view of a non-human subject S fitted with an example compression device 100 of some embodiments of the present disclosure. In some embodiments, the compression device 100 comprises one or more sleeves 102, each configured to fit a limb of a non-human animal, such as for example the non-human subject S (i.e., a horse) illustrated in FIG. 1. In some embodiments, the compression device 100 can comprise the same number of sleeves 102 as the non-human animal subject has legs (i.e. up to four sleeves for a dog or horse or other quadruped).

In some embodiments, the sleeves 102 can be appropriately shaped to fit the non-human subject S being fitted with the compression device 100. For example and without limitation, for the equine subject 100 (as well as other subjects), the sleeve(s) 102 for the front limb(s) can be cylindrically shaped around the limb from the coffin joint to the shoulder joint. In some embodiments, the sleeve(s) 102 for the hind limb(s) can also be cylindrically shaped but they can cover the entire leg from the pastern to the stifle, adjusting to the shape of the limb. In some embodiments, the compression device 100 comprises at least one sleeve 102 configured for a front limb of the non-human subject S and when worn by the non-human subject S, has a cylindrical shape and has a length that covers a distance from a coffin joint to a shoulder joint of the non-human subject S. In some embodiments, the compression device 100 comprises at least one sleeve 102 configured for a hind limb of the non-human subject S and, when worn by the non-human subject S, has a shape that adjusts to a shape of the hind limb and a length to cover the hind limb from a pastern to a stifle of the hind limb. In some embodiments, the compression device 100 comprises at least four sleeves 102, wherein two of the sleeves 102 are configured to respectively fit two front limbs of the non-human subject S, or other non-human animal subject, and two of the sleeves 102 are configured to respectively fit two hind limbs of the example non-human subject S.

In some embodiments, the sleeves 102 can be made from any suitable durable material that is capable of flexing with the swelling of the limb as well as dynamically flexing with the air compression tubing. For example, and without limitation, the sleeves 102 can be made from "parachute-like" material, neoprene, or any other suitable, durable material or fabric. In some embodiments, the sleeves 102 can comprise multiple layers of fabric. For example and without limitation, the material that the sleeves 102 can comprise a double layer for each limb.

In some embodiments, each of the sleeves 102 can comprise one or more zippers 106. In some embodiments at least one of the zippers can be used to secure the sleeve 102 around the leg of the non-human subject S. In some further embodiments, one or more of the other zippers 106 can be used to expand the sleeve 102 or the other zippers 106 can be used to fit the sleeve 102 around a different sized leg. In some embodiments, each of the zippers 106 are zipped from top to bottom or from bottom to top. In a particular embodiment, the zippers 106 are all zipped from top to bottom, which makes it easier for a single person to put on the sleeve(s) 102. In some embodiments, each of the zippers 106 are located on the caudal part of the leg. In some embodiments, each of the sleeves 102 comprises two zippers 106 on a front side of the sleeve 102 and three zippers 106 on a back side of the sleeve, wherein at least some of the zippers 106 are configured to provide a circumference adjustment to the sleeve 102. In some embodiments, the zippers 106 can be spaced 5 cm apart from each other, allowing for a 15 cm circumference adjustment to either cover a bigger variety of horses, or adjust throughout the treatment regimen with the same horse or other non-human subject S.

In some embodiments, each of the one or more sleeves 102 comprises one or more inflatable chambers. In some embodiments, the one or more inflatable chambers can comprise inflatable tubes, balloons, bladders, or any other suitable inflatable device. In some embodiments, the inflatable chamber can be inflated using a gas such as air or any other suitable gas. In some other embodiments, the inflatable chamber can be inflated using any suitable gas or fluid.

In some embodiments, the compression device 100 comprises one or more controllable air source 122 (or other suitable gas or fluid source) configured to inflate and deflate the inflatable chambers. In some embodiments, one controllable air source 122 is configured to inflate and deflate one or more inflatable chambers. For example and without limitation, one controllable air source 122 can be used to inflate 1, 2, 3, 4, or more inflatable chambers. In some other embodiments, one controllable air source 122 can be configured to inflate one to two inflatable chambers, which case, one additional controllable air source 122 would be needed for every limb being compressed over two legs. For example, if only three legs were being compressed, two controllable air sources 122 would be needed. In some embodiments, the controllable air source 122 is battery operated or has a cord that can connect to a power outlet. In some embodiments, the controllable air source 122 is battery operated and can be used in the stall or during transportation.

In the embodiment illustrated in FIG. 1, each controllable air source 122 is configured to have two ports or two hoses or tubing 104 that can be plugged into it at once. In some embodiments, each of the tubes or hoses 104 connects the controllable air source 122 to the one or more inflatable chambers within the sleeves 102. The controllable air source 122 is operably connected with the one or more inflatable chambers and the controllable air source 122 is configured to inflate and deflate the one or more inflatable chambers via the tubes or hoses 104. In some embodiments, each of the one or more inflatable chambers has an individual, discrete/separate, or corresponding tube or hose 104 connecting to the controllable air source 122. In some embodiments, a flap of fabric 108 covers the hose exits 104 from each individual inflatable air chamber, as well as the hose bundle going towards the controllable air source 122. In some embodiments, a logo and a name of the product is displayed on the flap 108. The one or more flap 108 is configured to cover each individual hose or tube 104 such that each hose or tube 104 cannot be accessed by the non-human subject S wearing the device.

In some embodiments, each sleeve 102 has four inflatable chambers, each chamber having an individual hose or tube 104 and each of the one or more hoses or tubes 104 connects into a bundle that is attached to a port that inserts into the controllable air source 122. In some embodiments, controllable air source 122 comprises an air pump. In some embodiments, the air pump has any desired measurement, such as but not limited to 15 cm in diameter and 5 cm height. In some embodiments, the pressure inside the controllable air source 122 can be adjusted from 20 mmHg to 80 mmHg in 20 mmHg increments, for example. Smaller increments are provided in some embodiments. The time of treatment can be adjusted to any suitable time, such as from 15 minutes to 45 minutes in one-minute increments. In other words, in some embodiments, the controllable air source 122 can be configured to inflate the air chambers via the individual hoses or tubes 104 to provide the appropriate therapy to the legs every minute for 15 minutes to 45 minutes or any other appropriate time. The controllable air source 122 can be stopped at any time during the treatment. The zippers 106 open from the bottom up, allowing for quick detachment of the sleeves 102.

In some embodiments, the controllable air source 122 is configured or preprogrammed to start inflating the one or more inflatable chambers at the most distal chamber (i.e., closest to the feet). In order to achieve this, in some embodiments, the tube or hose 104 is connected to the most distal inflatable chamber within the sleeve 102 and the most distal inflatable chamber is configured to inflate first followed by the other inflatable chambers of the one or more inflatable chambers. In some embodiments, all of the inflatable chambers are connected together, which allows air or fluid to flow from the most distal inflatable chamber to the other chambers. In some embodiments, the compression device 100 is configured to compress 1, 2, 3, or 4 limbs of the non-human subject S. In some embodiments, the compression device 100 is configured to compress all of the limbs of the non-human subject S assuming a sleeve 102 was applied to each limb of the non-human subject S.

In some embodiments, the fabrics and tubes are held in place using fasteners 110. In some embodiments, the fasteners 110 comprise buttons, snaps, or any other suitable fastener 110. In some embodiments, the compression device 100 comprises a pouch 112 or pocket configured to hold the controllable air source 122. In some embodiments, the one or more flap 108 can comprise hook and loop fasteners configured to secure the one or more flap 108 and the tubing or hose 102 to a saddle pad or spinal pad 114. In some embodiments, the saddle pad or spinal pad 114 is secured around the torso of the non-human subject S by a girth strap 120. In some embodiments, the girth strap 120 comprises a first end and a second end and is configured to loop under the torso or abdomen of the non-human subject S for attachment to the saddle pad or spinal pad 114.

In some embodiments, the saddle or spinal pad 114 and the sleeves 102 are further secured to the torso of the non-human subject S using the breastplate strap 118 and a Y-shaped strap 116 with a caudomedial attachment. In some embodiments, the compression device 100 comprises one or more Y-shaped strap 116 configured for detachably connecting from a caudal edge of the saddle pad or spinal pad 114 and extending toward the tail of the non-human subject S for detachably connecting to the one or more sleeves 102 configured for placement on one or more hind limbs of the non-human subject S. In some embodiments, the Y-shaped strap 116 comprises one strap having a y-configuration, such that the strap forks near the tail and each fork extends laterally to attach to the one or more sleeves 102 configured for placement on one or more hind legs of the non-human subject S in a manner out of the non-human subject's S reach.

Figure 2:
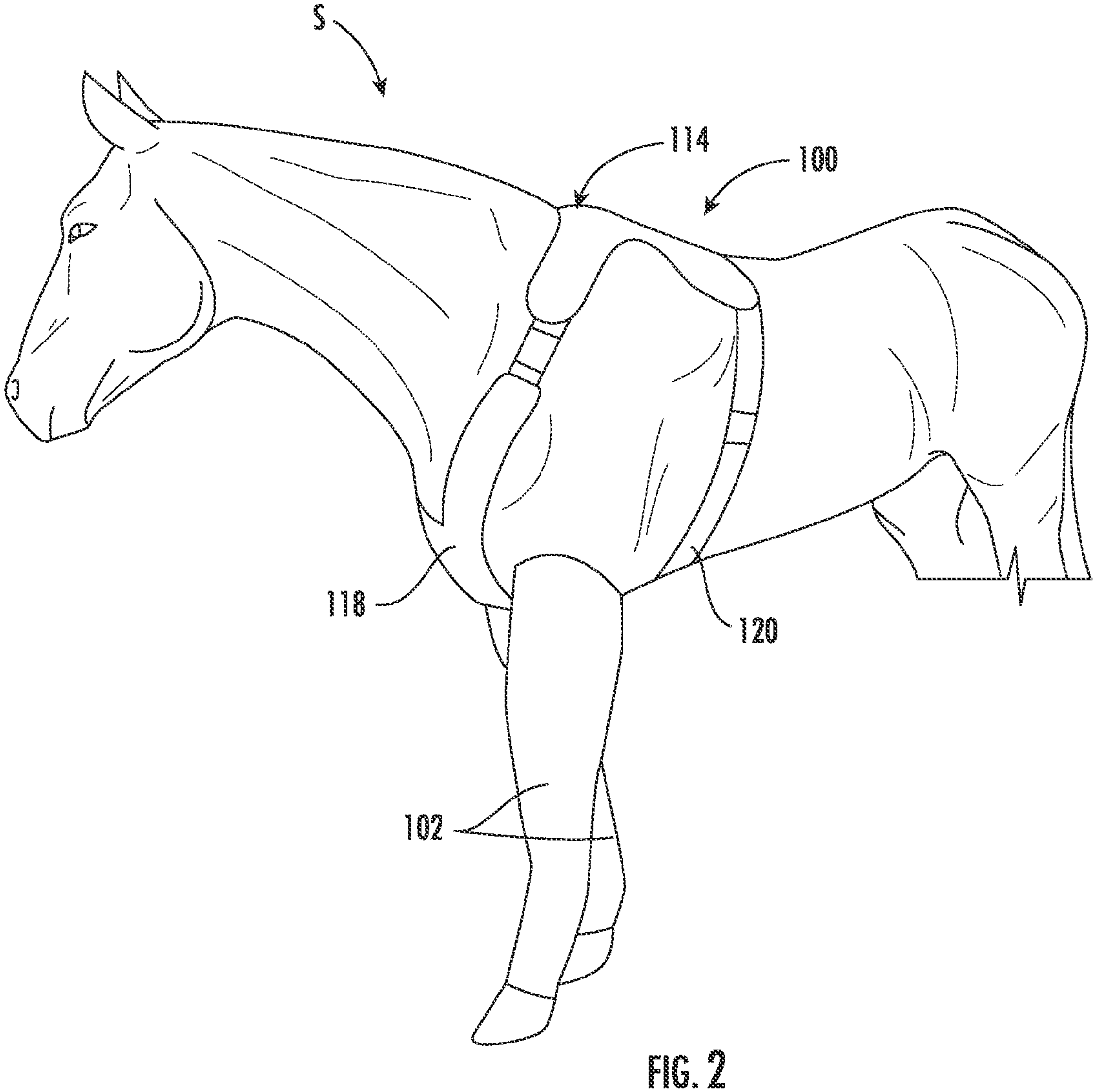
FIG. 2 is a front perspective view of a horse wearing a compression device in accordance with the presently disclosed subject matter.

Referring to FIG. 2, in some embodiments, the breastplate strap 118 comprises one or more strap configured for detachably connecting from a cranial edge of the saddle pad or spinal pad 114 toward a neck of the non-human subject S for detachably connecting to one or more sleeve configured for placement on one or more front limbs of the non-human subject S. In some embodiments, the one or more breastplate strap 118 comprises one strap having a y-configuration, such that the strap forks around the neck of the non-human subject S to connect to the saddle pad or spinal pad 114 and extends to the girth strap 120 to define a breast plate, wherein one or more sleeve 102 is configured for placement on one or more front limbs of the non-human subject S detachably connect to the breast plate in a manner out of the non-human subject's S reach.

In some embodiments, the saddle pad or spinal pad 114 comprises the pouch or pocket 112 which contains the controllable air source 122. In some embodiments, the saddle pad or spinal pad 114 comprises enough pouches or pockets 112 necessary to hold all of the necessary controllable air sources 122 for the compression device 100. For example and without limitation, in some embodiments, the compression device 100 comprises one, two, or more pockets or pouches 112. In some embodiments, as illustrated in FIG. 1, the one or more pouches or pockets 112 is configured to fall on a side and a medial aspect of the non-human subject S.

Figure 3:
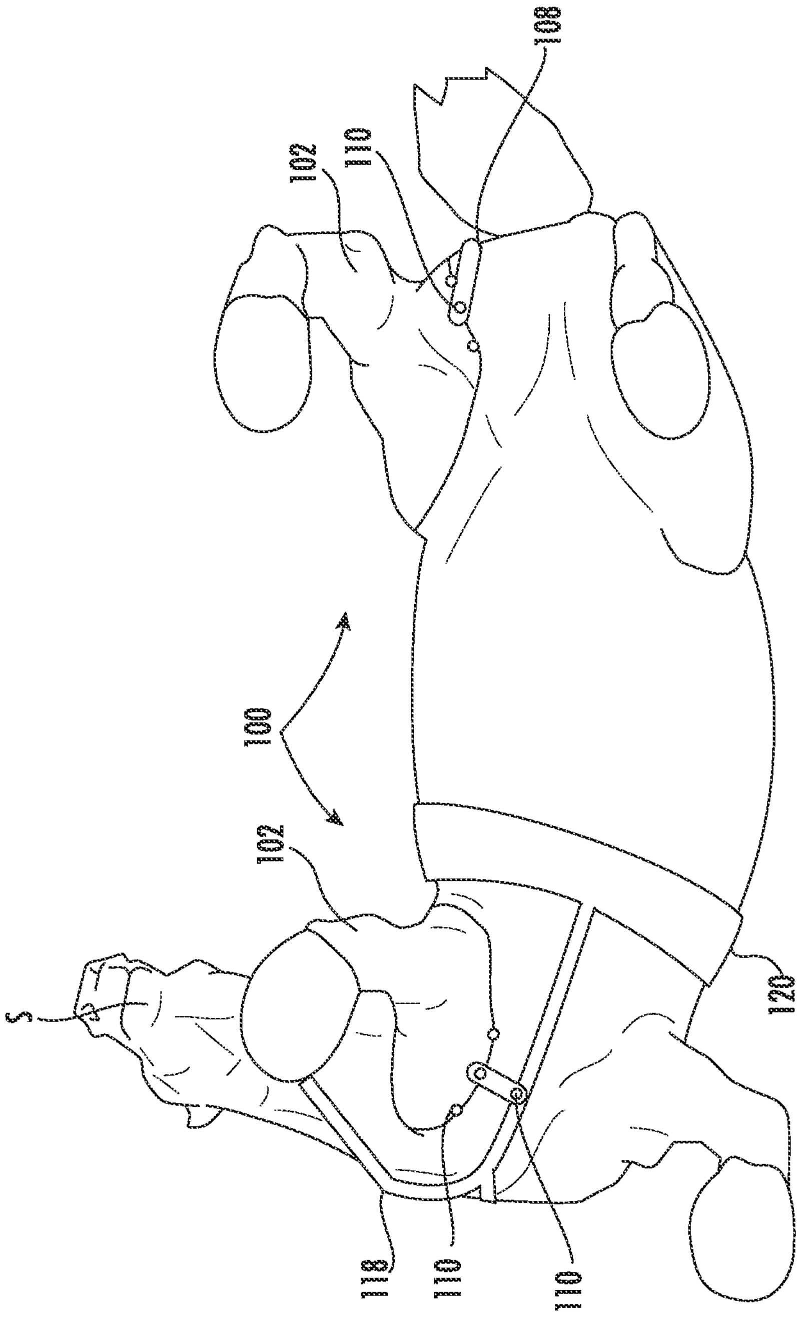
FIG. 3 is a bottom view of a horse wearing a compression device in accordance with the presently disclosed subject matter.

Referring to FIG. 3, which illustrates an underside view of the non-human subject S. As illustrated in FIG. 3, the girth strap 120 wraps around the underbelly or abdomen of the non-human subject S, securing the compression device 100 to the body of the non-human subject S. FIG. 3 also illustrates with more detail how the sleeves 102 are secured to the non-human subject S using the fasteners 110.

Figure 4:
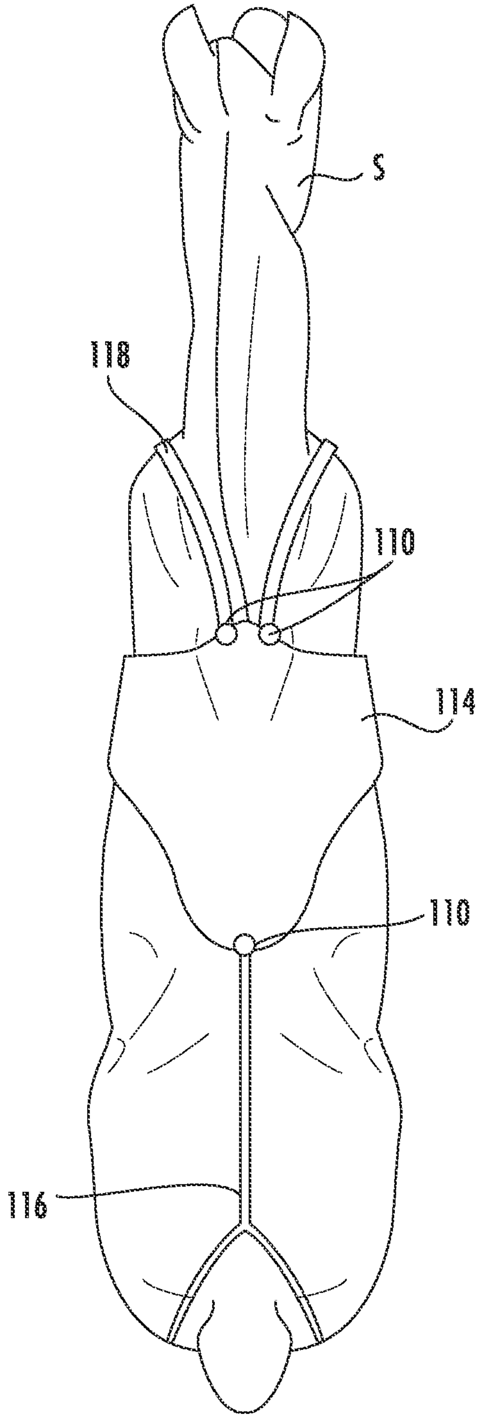
FIG. 4 is a top view of a horse wearing a compression device in accordance with the presently disclosed subject matter.
Figure 7A:
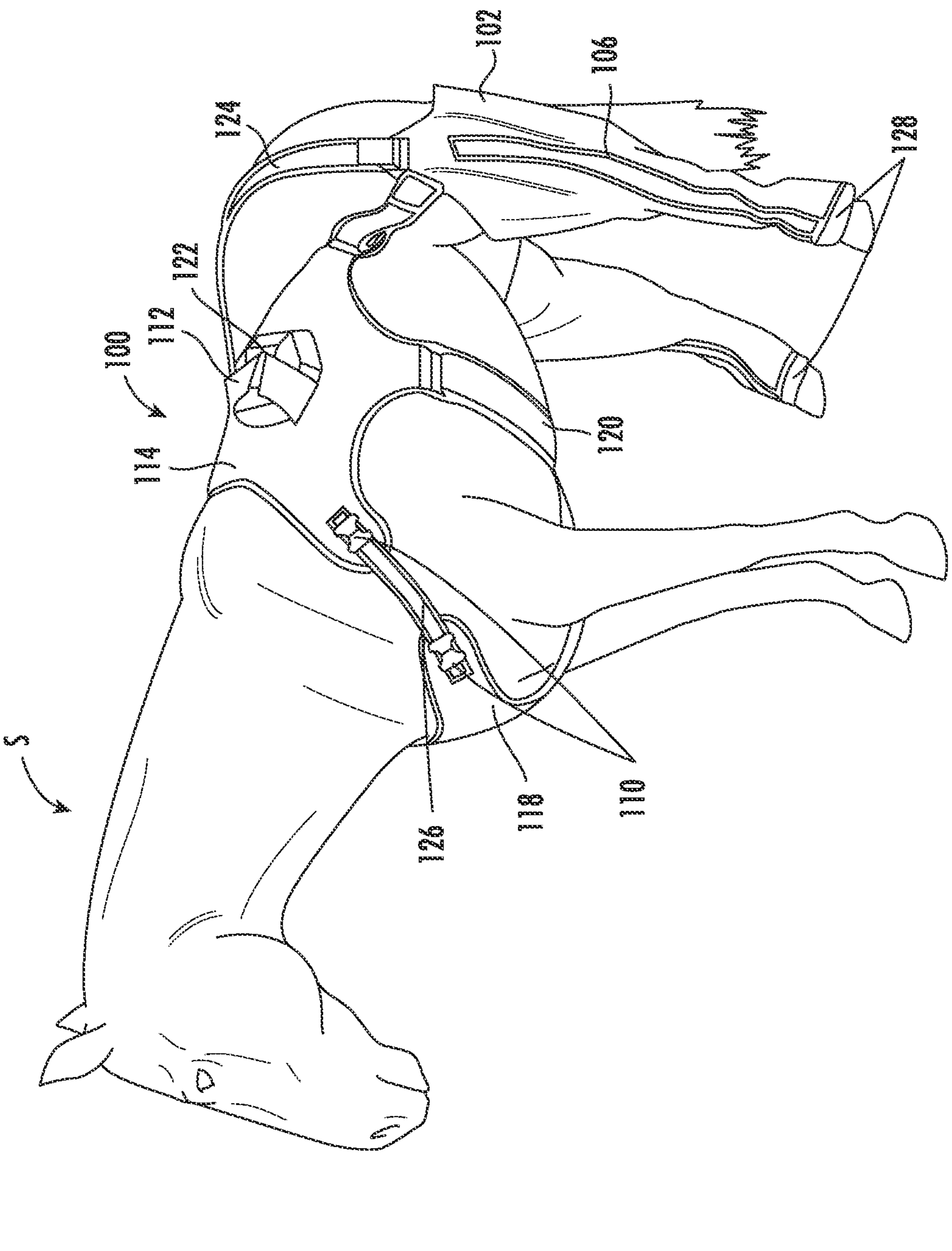
FIG. 7A is a side view of an example implementation of a compression device of the presently disclosed subject matter.

Referring to FIG. 4, which illustrates a top view of the non-human subject S with the saddle pad or spinal pad 114 secured on the non-human subject S. As illustrated in FIG. 4, in some embodiments, the Y-shaped strap 116 comprises a Y-shaped fork that straps around either side of the non-human subject's S tail. The Y-shaped strap 116 is configured to secure the saddle pad or spinal pad 114 to any sleeves 102 wrapped around the hind legs of the non-human subject S. This helps hold up the sleeves 102 on the hind legs whenever the sleeves 102 are not inflated. Additionally, in some embodiments, the breastplate strap 118 is configured to secure the saddle pad or spinal pad 114 to any sleeves 102 wrapped around the front legs of the non-human subject S. This helps hold up the sleeves 102 on the front legs whenever the sleeves 102 are not inflated. The breastplate strap 118 and the Y-shaped strap 116 are also configured to help prevent the saddle pad or spinal pad 114 from slipping. As illustrated in FIG. 7A below, the Y-shaped strap 116 can be replaced with a removable rear strap, which is not Y-shaped, but instead runs perpendicularly to the length of the back of the non-human subject S.

As will be appreciated by one of ordinary skill in the art, the above described sequence of steps can be changed or varied as needed in order to properly and effectively apply the devices and systems to an animal.

In some embodiments, the compression device 100 is fully battery operated, light weight and transportable. It is safe to use without any supervision, providing the horse or other non-human animal is used to handling and treatments. The first few treatments are typically done under supervision. Positive reinforcement and depending on the temperament, possibly light sedation, are employed in some embodiments to train the animal to stand for the device to provide the best effect. After the first few treatments, the animals appear to appreciate the relief and seem to enjoy the treatment.

Figure 5A:
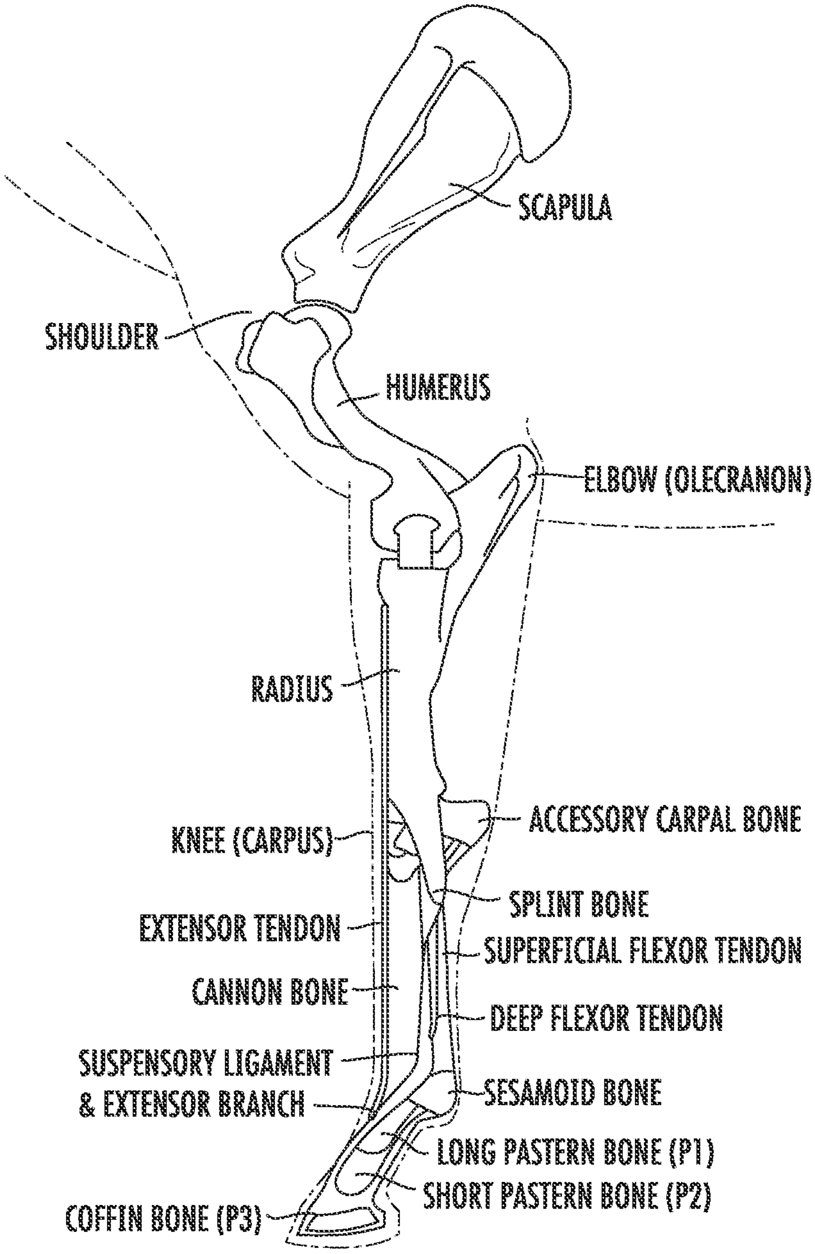
FIG. 5A is a close-up side view of a front limb of a horse wherein internal anatomical features are shown.
Figure 5B:
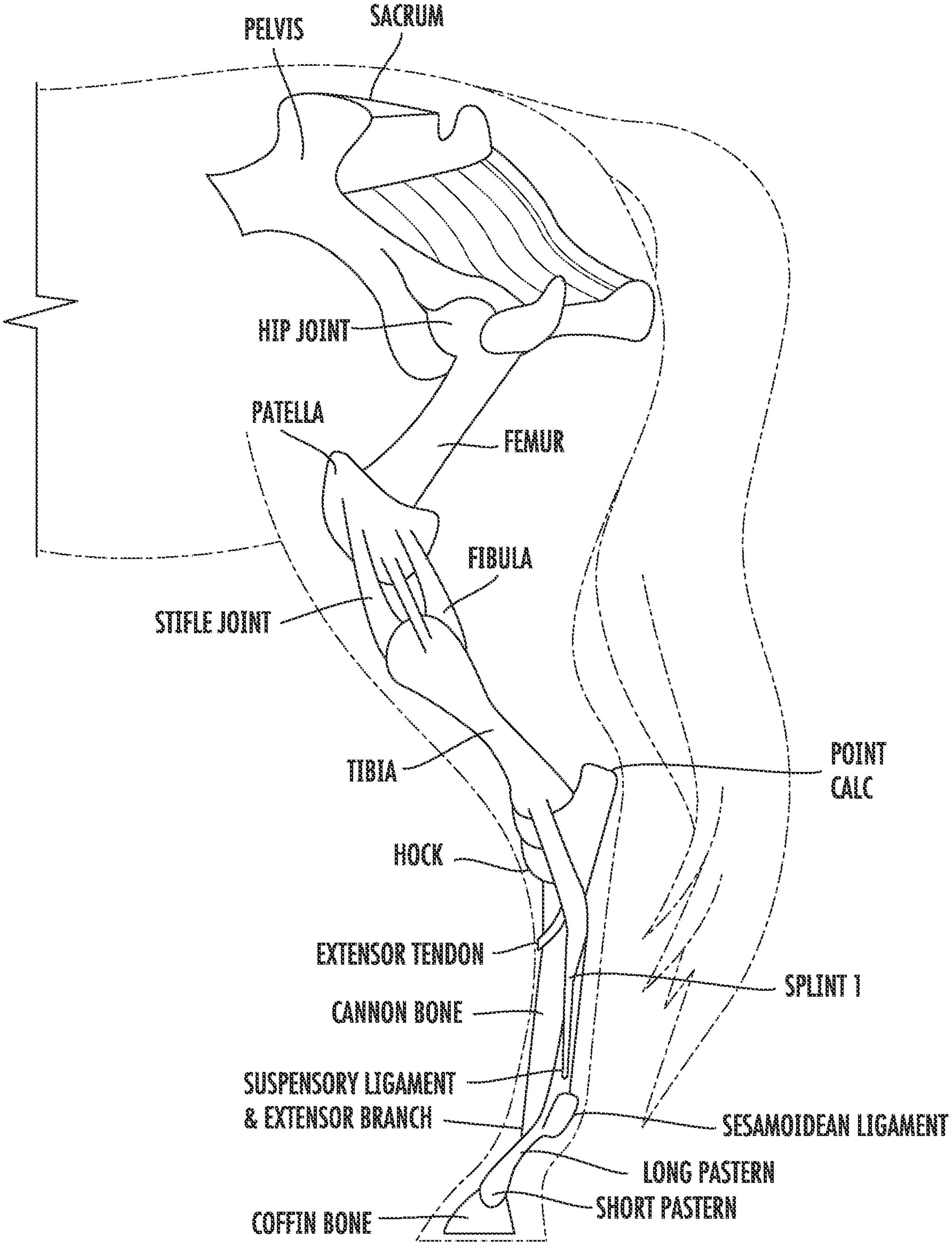
FIG. 5B is a close-up side view of a hind limb of a horse wherein internal anatomical features are shown.

FIG. 5A and FIG. 5B are illustrations of the internal anatomy (i.e., skeletal structure) of an equine subject's front (FIG. 5A) and hind (FIG. 5B) legs. These figures are provided for ease of understanding of some of the anatomical references made in the present disclosure.

Figure 6A:
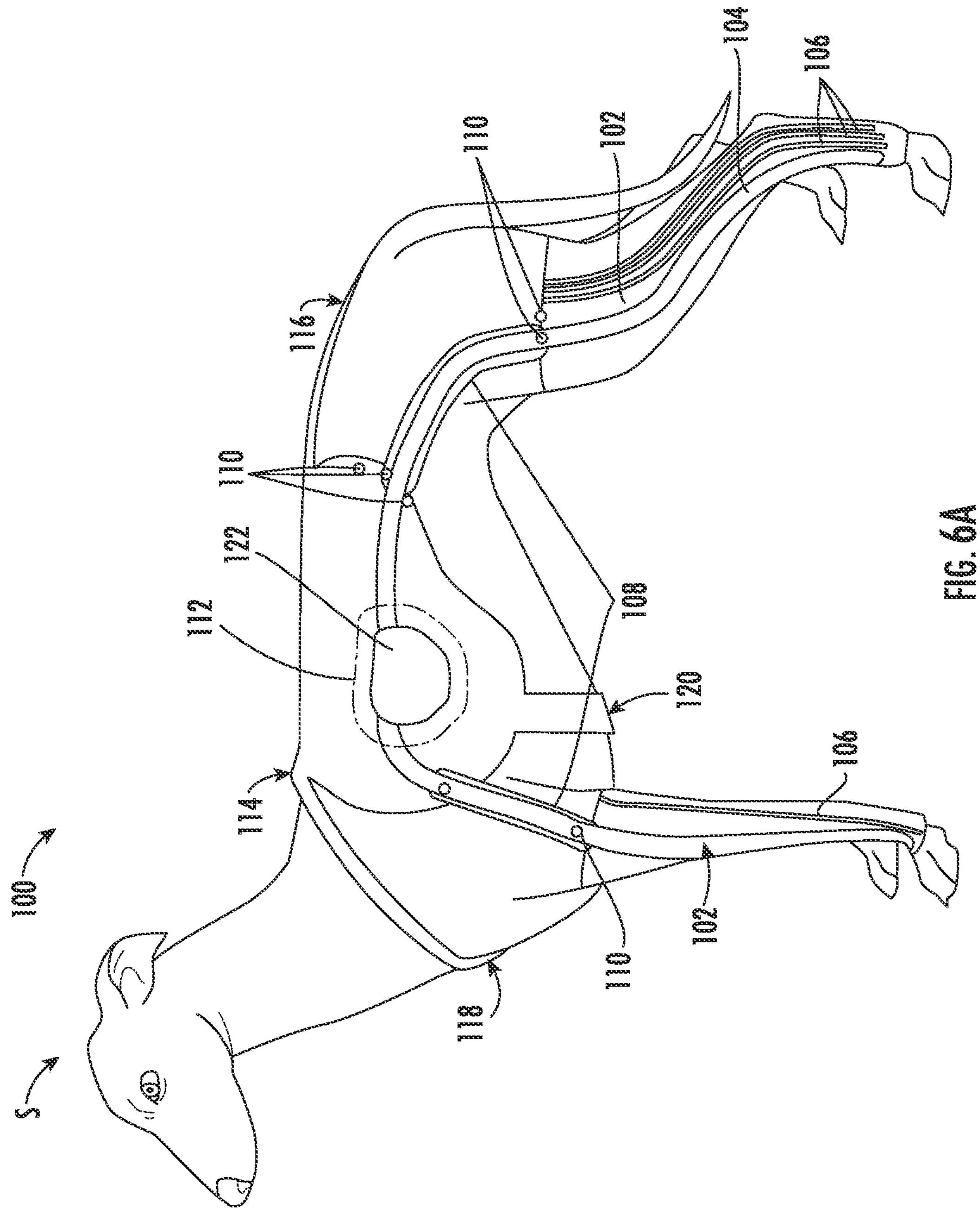
FIG. 6A is a side view of a dog wearing a compression device in accordance with the presently disclosed subject matter.
Figure 6B:
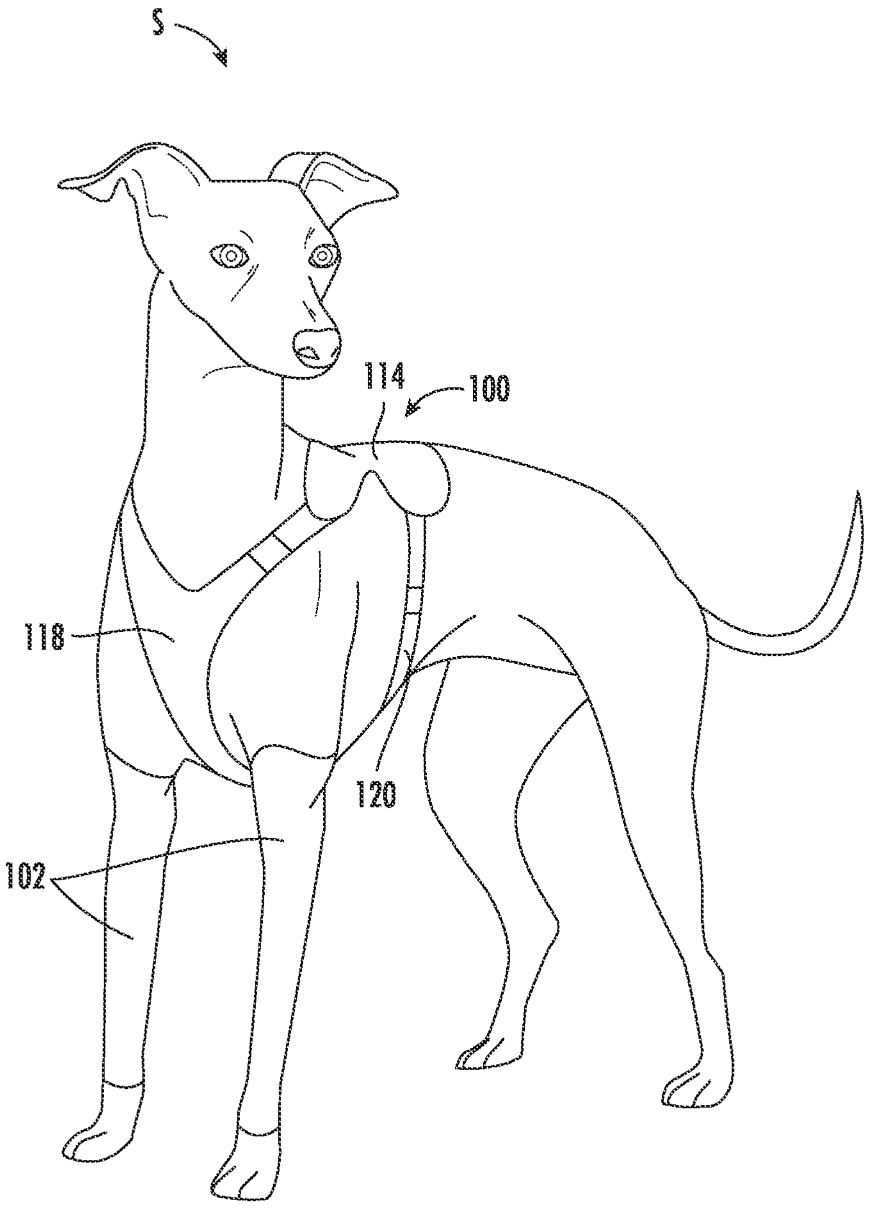
FIG. 6B is a front and side view of a dog wearing a compression device in accordance with the presently disclosed subject matter.

FIG. 6A and FIG. 6B are provided to illustrate the compression device 100 of the present disclosure being applied or worn by a canine non-human subject S such as a greyhound dog. In this particular embodiment, the device is nearly identical to the ones described in FIG. 1-4, with like reference numbers referring to like parts, except it has been miniaturized to fit a smaller non-human animal than an equine. As discussed herein and as illustrated by these figures, the subject matter of the present disclosure can be adapted, miniaturized, enlarged, or otherwise altered to fit any suitable non-human animal for compression therapy of their limbs. Like the use for canine non-human subject S, the subject matter of the present disclosure can also be applied to and used for camelid subjects such as camels.

Figure 7B:
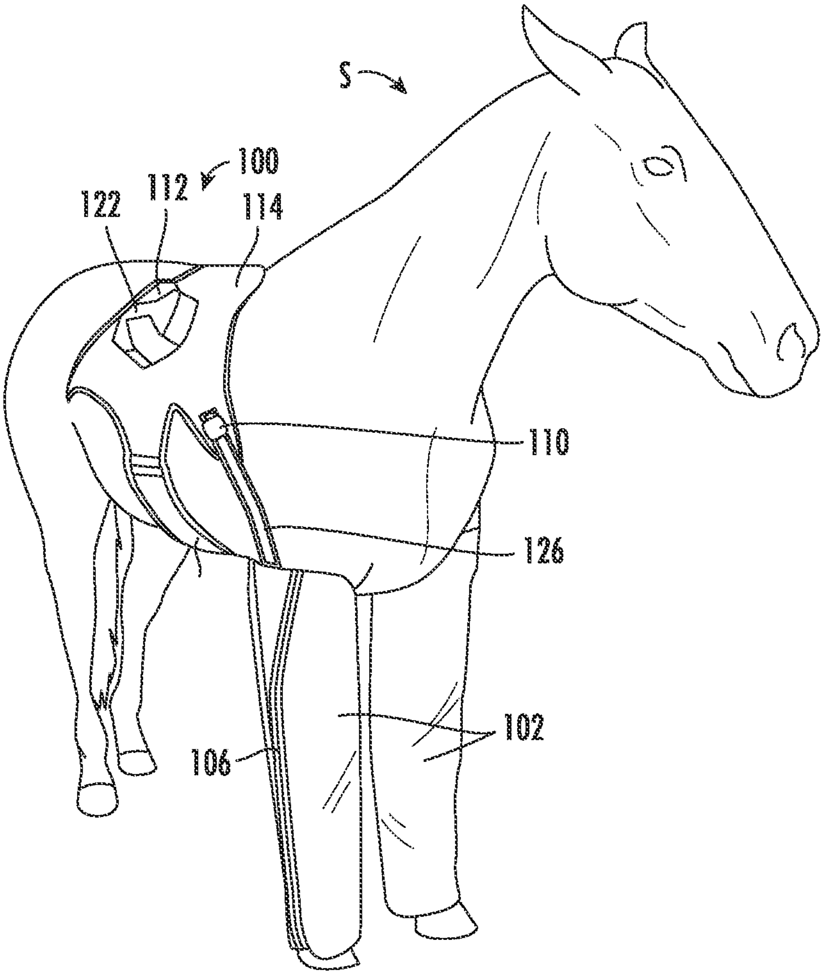
FIG. 7B is s front view of an example implementation of a compression device of the presently disclosed subject matter.

Referring to FIG. 7A and FIG. 7B, which illustrate an example implementation of a possible compression device 100 of the present disclosure. These figures illustrate that, in some embodiments, the various attachments and connections between the saddle pad or spinal pad 114 and the sleeves 102 can vary based on the desired design. For example and without limitation, the breastplate strap 118 can be removable, as shown in FIG. 7B. The saddle pad or spinal pad 114 can be connected to the breastplate strap 118 via adjustable straps 126 and fasteners 110. In some embodiments, where the breastplate strap 118 is not used, the adjustable straps 126 can fasten the saddle pad or spinal pad 114 to the sleeves 102.

Furthermore, in some embodiments, instead of using the Y-shaped strap 116 from FIG. 1 and FIG. 4, a removable rear strap 124 that extends across the back of the non-human subject S and which holds up the sleeves 102, which are deflated in FIG. 7A, can be used. The removable rear strap 124 can be used whenever there are sleeves 102 being worn on the hind legs of the non-human subject S. Additionally, the sleeves 102 can comprise cuffs 128 used to secure the sleeves 102 around the bottom of the non-human subject's S legs. FIG. 7A illustrates sleeves 102 that are deflated and, as pictured, not compressing the legs of the non-human subject S. FIG. 7B illustrates sleeves 102 that are inflated and, as pictured, compressing the legs of the non-human subject S.

Figure 8:
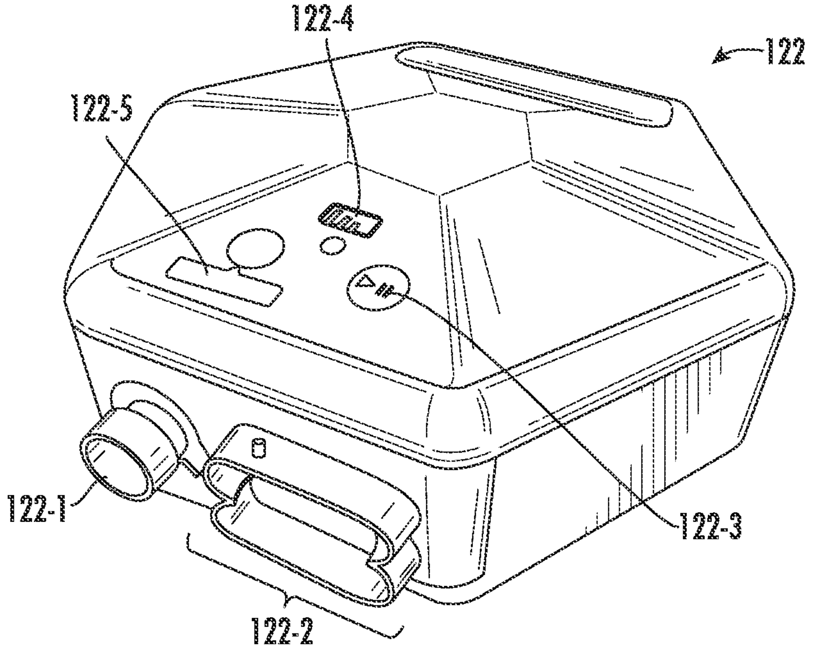
FIG. 8 is a close-up view of an example implementation of a controllable air source of the presently disclosed subject matter.

FIG. 8 illustrates an example implementation of the controllable air source 122 as described above. In some embodiments, the controllable air source 122 can comprise a battery-operated air pump or other suitable device. As described above, in some embodiments, the controllable air source 122 can comprise a wired device as well, wherein a cord can plug into an electrical outlet for power. As depicted, the controllable air source 122 can be hexagonal in shape or any other suitable shape that will fit on the side of the non-human subject S. Additionally, the size and power output of the controllable air source 122 can be adjusted to fit a non-human animal of any suitable size.

In some embodiments, the controllable air source 122 comprises a power adjustment dial 122-1. The power adjustment dial 122-1 can be configured to adjust the amount of air that is being provided to the sleeves 102. In some embodiments, the controllable air source 122 comprises a hose connector 122-2. The hose connector 122-2 can be configured to connect one or more hoses or tubes to the controllable air source 122 for inflating and deflating the sleeves 102. In some embodiments, the controllable air source 122 comprises a start and stop button 122-3 configured to start inflating or deflating the sleeves 122 or pause the process. In some embodiments, the controllable air source 122 comprises a battery power indicator 122-4 configured to display to a user of the device what the batter power level of the controllable air source 122 is. In some embodiments, the controllable air source 122 comprises and status indicator 122-5 which indicates a status (i.e., inflated, deflated, or error) of each of the sleeves 102 connected to the controllable air source 122. In some embodiments, the controllable air source 122 comprises a digital display on which the start and stop button 122-3 can be displayed and actuated (i.e., the digital display can be a touchscreen display), the battery power indicator 122-4 can be displayed, and the status indicator 122-5 can be displayed.

Figure 9:
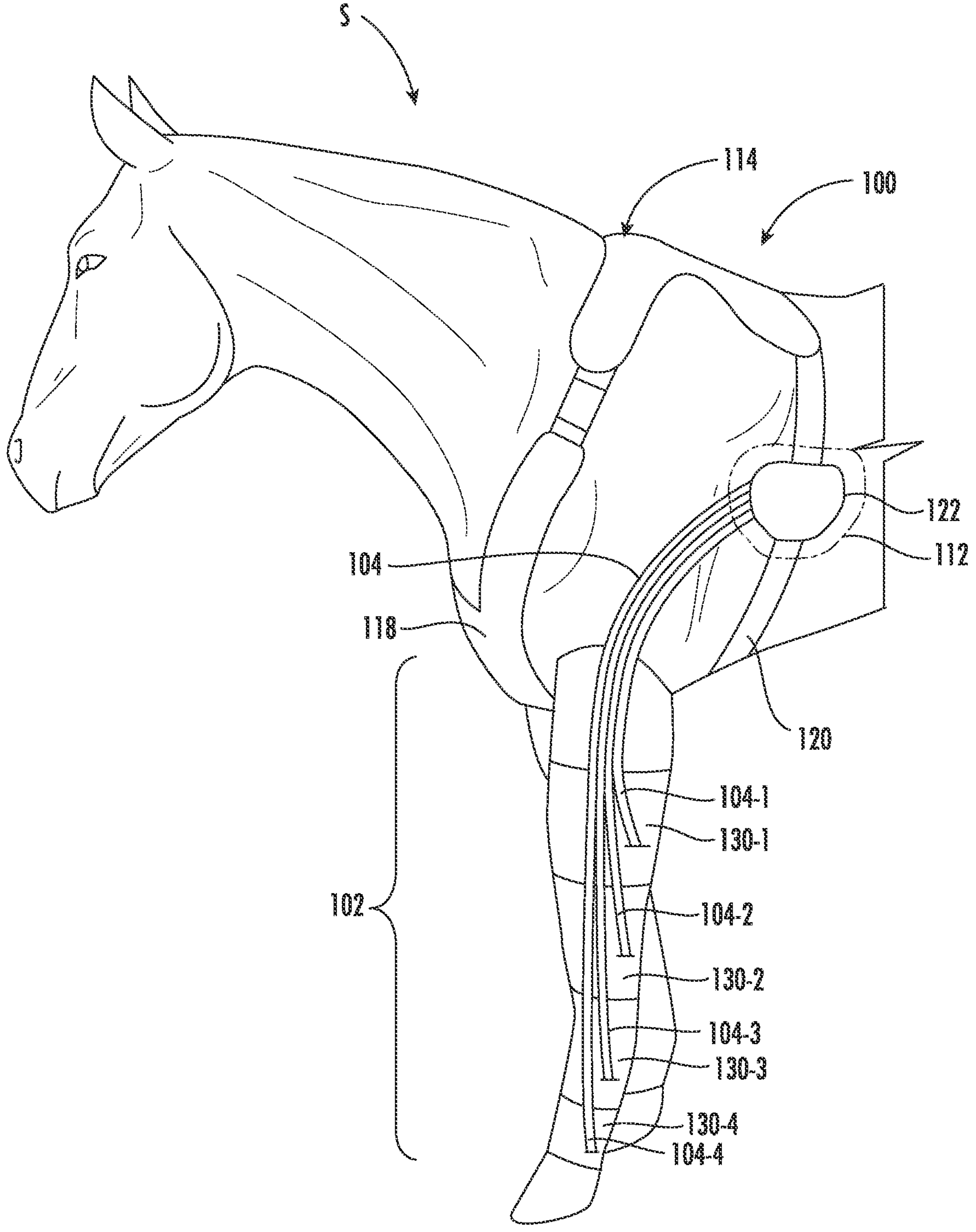
FIG. 9 is a close-up view of an example implementation of the inflatable air chambers visualized within the sleeves.

Referring to FIG. 9, which illustrates an example embodiment of a possible inflatable air chamber design. For example, and as described hereinabove, in some embodiments, each sleeve 102 comprises four inflatable chambers. In some cases, because of the different anatomies of the front and hind legs of various quadrupeds, the design of the inflatable chambers is flexible to accommodate such differences between the hind and front legs. For example and without limitation, some sleeves 102 can be configured to deliver appropriate compression therapy to front legs and some sleeves 102 can be configured to deliver the appropriate compression therapy to hind legs. FIG. 9 illustrates a design that can be appropriate for use on equine front legs.

In the illustration depicted in FIG. 9, the sleeve 102 is shown as see-through, as a ghost-image, or the like. In other words, as shown in FIG. 1 and as described herein, the sleeves 102 comprise at least two layers of fabric, one layer on the outside protecting the air chambers from the outside, and one layer between the air chambers and the skin of the non-human subject's leg. In some embodiments, the inflatable air chambers 130-1 through 130-4 are inside the layers of the sleeves 102, like a pillow inside of a pillow case, where the pillow is the air chamber(s) and the pillow case is the fabric of the sleeve. In some embodiments, each of the inflatable air chambers 130-1 through 130-4 can be appropriately shaped to fit different portions of the leg of the non-human subject S. In some embodiments, the general shape of the inflatable air chambers 130-1 through 130-4 can be annular or donut-shaped (i.e., especially when inflated). Although the present embodiment describes the shape and number of the inflatable air chambers 130-1 through 130-4 as annular and around 4, those having ordinary skill in the art will appreciate that the inflatable air chambers 130-1 through 130-4 can any suitable shape and number. This includes the inflatable air chambers 130-1 through 130-4 being in the shape of a strip or vertically oriented chamber that runs the length of the sleeve 102.

In some embodiments, as depicted in FIG. 9, the sleeves 102 can comprise approximately four inflatable air chambers 130-1 through 130-4. In some embodiments, the sleeves 102 can comprise four or more inflatable air chambers 130-1 through 130-4. In some embodiments, the sleeves 102 can comprise four or less inflatable air chambers 130-1 through 130-4. In some embodiments, the number of inflatable air chambers 130-1 through 130-4 is dependent upon the species, size, and anatomy of the non-human subject S. For example, an equine, canine, or camelid subject might need fewer or more chambers based on their anatomy. In some embodiments, each sleeve 102 for the front legs of the subject can comprise any number of inflatable air chambers 130-1 through 130-4. In some embodiments, each sleeve 102 for the front legs of the subject can comprise between and including 1 to 20 inflatable air chambers 130-1 through 130-4.

In some embodiments, as depicted in FIG. 9, a bundle of tubes or hoses 104 can be connected to the controllable air source 122 for each corresponding sleeve 102 attached to the non-human subject S, where the number of tubes or hoses 104 in each bundle is equal to the number of inflatable air chambers 130-1 through 130-4 in each sleeve. For example and without limitation, in the example embodiments illustrated in FIG. 9, the sleeve 102 comprises four inflatable air chambers 130-1 through 130-4. Thus, as illustrated in FIG. 9, the bundle of tubes or hoses 104 comprises four separate tubes or hoses, where each hose or tube 104 connects to a corresponding inflatable air chamber 130-1 through 130-4. For example and without limitation, first hose or tube 104-1 connects to first inflatable air chamber 130-1, second hose or tube 104-2 connects to second inflatable air chamber 130-2, third hose or tube 104-3 connects to third inflatable air chamber 130-3, and fourth hose or tube 104-4 connects to fourth inflatable air chamber 130-4.

In some embodiments, as discussed herein above, the controllable air source 122 is configured to individually inflate and/or deflate each of the inflatable air chambers 130-1 through 130-4. In some embodiments, for example, the controllable air source 122 is configured to inflate the most distal inflatable chamber (i.e., the fourth inflatable chamber 130-4) first and then inflate the other chambers later based on the ideal compression therapy for the non-human subject S. In some embodiments, the controllable air source 122 is configured to inflate and/or deflate all four of the chambers simultaneously or individually at separate time. In some embodiments, the controllable air source 122 is configured to inflate each of the inflatable air chambers of each applied sleeve at any given time based on the appropriate compression therapy. For example, if two sleeves 102 are applied to the front legs of the non-human subject S at the same time, the controllable air source 122 is configured to begin inflating the fourth inflatable air chamber 130-4 of each sleeve 102 at the same time. The same is true for each of the other individual inflatable air chambers of each sleeve 102 regardless of the number of chambers in each sleeve 102.

In some embodiments, the inflatable chamber design for the hind legs is identical to the design for the front legs as described above. In some embodiments, sleeves can be applied to both the front legs and the hind legs, in which case, the controllable air source 122 is configured to be able to individually control each inflatable air chamber independently for each sleeve. However, in some embodiments, the design of the inflatable air chambers for the hind legs can be different than the design of the front legs. Namely, in some embodiments, the inflatable air chambers 130-1 through 130-4 in the sleeves 102 applied to the hind legs of the non-human subject S are not as equally distributed along the hind leg of the non-human subject S as those of the front legs due to a different anatomy of the back leg from the front legs.

Those having ordinary skill in the art will appreciate that the devices and systems described herein can be altered and adjusted to fit any non-human animal. It will be understood that various details of the presently disclosed subject matter may be changed without departing from the scope of the presently disclosed subject matter. Furthermore, the foregoing description is for the purpose of illustration only, and not for the purpose of limitation.

REFERENCES

All references listed in the instant disclosure, including but not limited to all patents, patent applications and publications thereof, scientific journal articles, and database entries (including but not limited to UniProt, EMBL, and GENBANK® biosequence database entries and including all annotations available therein) are incorporated herein by reference in their entireties to the extent that they supplement, explain, provide a background for, and/or teach methodology, techniques, and/or compositions employed herein.

The discussion of the references is intended merely to summarize the assertions made by their authors. No admission is made that any reference (or a portion of any reference) is relevant prior art. Applicants reserve the right to challenge the accuracy and pertinence of any cited reference.

1. aaep.org/horsehealth/lymphangitis-frustrating-condition
2. U.S. Pat. No. 6,558,338
3. PCT Publication No. WO 2012/094712

What is claimed is:

1. A compression device for an equine subject, the compression device comprising: a plurality of sleeves, physically separate from one another, each sleeve configured to fit a respective limb of the equine subject, each sleeve comprising one or more inflatable chambers and the plurality of sleeves being configured to be selectively applied to one or more limbs of the equine subject; wherein at least one of the plurality of sleeves is configured for a front limb of an equine subject and when worn by the equine subject, has a cylindrical shape along its length and has a length that covers a distance continuously from a coffin joint to a shoulder joint of the equine subject; and wherein at least one of the plurality of sleeves is configured for a hind limb of the equine subject and, when worn by the equine subject, has a shape that adjusts to a shape of the hind limb in a non-cylindrical, anatomically contoured manner and a length to cover the hind limb from a pastern to a stifle of the hind limb; and a controllable air source operably connected with the one or more inflatable chambers of the at least one front-limb sleeve and at least one hind-limb sleeve and configured to controllably inflate and deflate the one or more inflatable chambers.

2. The compression device of claim 1, wherein the plurality of sleeves comprises four sleeves, wherein two of the four sleeves are configured to respectively fit two front limbs of the equine subject and two of the four sleeves are configured to respectively fit two hind limbs of the equine subject.

3. The compression device of claim 1, wherein each sleeve comprises one or more zippers.

4. The compression device of claim 1, wherein each sleeve comprises two zippers on a front side of the sleeve and three zippers on a back side of the sleeve, wherein the zippers are configured to provide a circumference adjustment.

5. The compression device of claim 3, wherein the zippers are configured to zip from top to bottom.

6. The compression device of claim 1, wherein each of the one or more sleeves has four inflatable chambers.

7. The compression device of claim 1, wherein the controllable air source is operably connected with the one or more inflatable chambers and the controllable air source is configured to inflate and deflate the one or more inflatable chambers, wherein the controllable air source further comprises one or more hoses that connect the controllable air source to the one or more inflatable chambers.

8. The compression device of claim 1, wherein each of the one or more inflatable chambers has an individual hose connecting to the controllable air source.

9. The compression device of claim 7, further comprising one or more flaps covering each individual hose, such that each hose cannot be accessed by the equine subject wearing the device.

10. The compression device of claim 7, wherein at an edge of each sleeve, each of the one or more hoses connect into a bundle that is attached to a port that inserts into the controllable air source.

11. The compression device of claim 10, wherein the controllable air source is configured such that two ports can be plugged in at once.

12. The compression device of claim 1, wherein the controllable air source is an air pump.

13. The compression device of claim 1, wherein the controllable air source is battery operated.

14. The compression device of claim 1, wherein the controllable air source is preprogrammed to start inflating the one or more chambers at the most distal chamber.

15. The compression device of claim 1, further comprising a saddle pad configured for placement on a body of the equine subject, the saddle pad comprising one or more pockets to house the controllable air source.

16. The compression device of claim 15, wherein the one or more pockets is configured to fall on a side and a medial aspect of the equine subject.

17. The compression device of claim 15, further comprising a girth strap having a first end and a second end and configured to loop under an abdomen of the equine subject for attachment to the saddle pad.

18. The compression device of claim 15, further comprising one or more straps configured for detachably connecting from a caudal edge of the saddle pad and extending across a back of the equine subject for detachably connecting to the one or more sleeves configured for placement on one or more hind limbs of the equine subject animal.

19. The compression device of claim 18, wherein the one or more straps comprises one strap across a back of the equine subject and attaches to the one or more sleeves configured for placement on one or more hind legs of the equine subject in a manner out of the equine subject's reach, wherein each of the one or more sleeves configured for placement on one or more hind legs of the equine subject is also connected to the saddle pad using an adjustable strap.

20. The compression device of claim 15, further comprising one or more straps configured for detachably connecting from a cranial edge of the saddle pad toward a neck of the equine subject for detachably connecting to one or more sleeves configured for placement on one or more front limbs of the equine subject.

21. The compression device of claim 20, wherein the one or more strap comprises one strap having a y-configuration, such that the strap forks around a neck of the equine subject to connect to the saddle pad and extends to the girth strap to define a breast plate, wherein one or more sleeve configured for placement on one or more front limbs of the equine subject detachably connect to the breast plate in a manner out of the equine subject's reach.

22. A method of compressing a limb of an equine subject, the method comprising:

providing an equine subject having a limb to be compressed; and employing a compression device of claim 1 to compress the limb of the equine subject.

23. The method of claim 22, wherein employing a compression device of claim 1 comprises: applying a sleeve of a compression device of claim 1 to the limb of the equine subject; and inflating and deflating one or more of the inflatable chambers of the sleeve, whereby the limb of the equine subject is compressed.

24. The method of claim 22, wherein at least one cycle of inflating and deflating of the one or more chambers starts by inflating the most distal chamber.

25. The method of claim 22, comprising compressing all of the equine subject's limbs.

26. The method of claim 22, wherein the equine subject having the limb to be compressed comprises the equine subject suffering from a disease or disorder or a sporting or work equine subject in need of warm-up prior to a sporting event or work event, or recovery after a sporting event or work event.

27. The method of claim 26, wherein the disease or disorder comprises lymphatic drainage, edema reduction post-surgery, lymphangitis, laminitis, cellulitis, or any combination thereof.

* * * * *